(12) United States Patent
Engesser et al.

(10) Patent No.: US 7,413,347 B2
(45) Date of Patent: Aug. 19, 2008

(54) FLUID DYNAMIC BEARING SYSTEM

(75) Inventors: Martin Engesser, Donaueschingen (DE); Stefan Schwamberger, Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 343 days.

(21) Appl. No.: 11/224,783

(22) Filed: Sep. 13, 2005

(65) Prior Publication Data

US 2006/0210205 A1    Sep. 21, 2006

(30) Foreign Application Priority Data

Sep. 21, 2004   (DE)   ............ 10 2004 045 629

(51) Int. Cl.
    *F16C 32/06*   (2006.01)
(52) U.S. Cl. ...................... 384/107; 384/100
(58) Field of Classification Search ............. 384/100, 384/107, 112, 119, 121–123, 132, 905; 310/90, 310/67 R
    See application file for complete search history.

(56) References Cited

U.S. PATENT DOCUMENTS

| | | | | |
|---|---|---|---|---|
| 5,524,985 A * | 6/1996 | Dunfield | ............ | 384/107 |
| 5,770,906 A * | 6/1998 | Hazelton et al. | ........... | 310/90 |
| 5,806,987 A * | 9/1998 | Nose et al. | ........... | 384/100 |
| 6,175,547 B1 * | 1/2001 | Kogure | ........... | 384/107 |
| 6,176,618 B1 * | 1/2001 | Kawawada et al. | ........... | 384/107 |
| 6,354,742 B1 * | 3/2002 | Iwaki et al. | ........... | 384/107 |
| 6,447,167 B1 * | 9/2002 | Kashiwada et al. | ........ | 384/100 |
| 6,900,567 B2 * | 5/2005 | Aiello et al. | ........... | 310/90 |
| 6,991,376 B2 * | 1/2006 | Aiello et al. | ........... | 384/107 |
| 7,147,376 B2 * | 12/2006 | Shimizu et al. | ........... | 384/107 |
| 2003/0048577 A1 * | 3/2003 | Kayama et al. | ........... | 360/99.08 |
| 2003/0174913 A1 * | 9/2003 | Kull | ........... | 384/107 |
| 2003/0202722 A1 * | 10/2003 | Obara | ........... | 384/107 |
| 2004/0091187 A1 * | 5/2004 | Aiello et al. | ........... | 384/112 |
| 2004/0223672 A1 * | 11/2004 | Satoh | ........... | 384/107 |
| 2004/0223673 A1 * | 11/2004 | Tiller et al. | ........... | 384/107 |

FOREIGN PATENT DOCUMENTS

JP          04039415 A  *  2/1992
WO       WO 9418464 A1 *  8/1994

* cited by examiner

*Primary Examiner*—Marcus Charles
(74) *Attorney, Agent, or Firm*—Cooper & Dunham LLP (57) ABSTRACT

A fluid dynamic bearing system having at least one stationary part and one rotating part that form a bearing gap filled with bearing fluid between the opposing bearing surfaces, at least one end of the bearing gap being open and sealed against the environment by a sealing means, pumping grooves being provided on at least two spatially separated bearing surfaces to generate hydrodynamic pressure and at least one supply volume connected to the bearing gap being available for the bearing fluid. The distinctive feature of the invention is that the sealing means are formed by pumping grooves that are disposed at the open and of the bearing gap on at least one of the bearing parts and designed in such away that they generate a pumping action on the bearing fluid directed towards the interior of the bearing and, as a result, create a dynamic seal for the open end of the bearing. The bearing system itself is designed as a compact unit preferably consisting of only three parts.

20 Claims, 10 Drawing Sheets

FLUID DYNAMIC BEARING SYSTEM

BACKGROUND OF THE INVENTION

The invention relates to a fluid dynamic bearing system, particularly a small-scale fluid dynamic bearing system for spindle motors such as are employed, for example, in hard disk drives.

PRIOR ART

The ongoing miniaturization of hard disk drives is giving rise to new problems in their design and construction, particularly with regard to the design and construction of small drive motors and suitable bearing systems. Although roller bearing systems have mainly been used to date, fluid dynamic bearing systems are becoming increasingly popular due to their small-scale construction and higher precision. However, conventional solutions in the design of fluid dynamic hard disk drive bearings and methods for their manufacture are either impossible to apply or can only be applied with difficulty. The smaller the bearing systems get, the lower are their load-bearing capacity and stiffness, particularly in conventional designs.

Another problem for fluid bearings is presented by their sealing systems. Miniaturization of the bearing in particular means that their sealing arrangements have to be adapted accordingly. It is necessary for the bearing fluid to be given unimpeded access from the fluid supply to the actual bearing regions. On the other hand, it is important to ensure that no fluid escapes from the bearing. In view of the high build-up of pressure, this is particularly problematic for bearings that have several sealing points.

SUMMARY OF THE INVENTION

The object of the invention is thus to create a fluid dynamic bearing that shows high reliability, in a small-scale construction, in terms of tightness, capacity to take up bearing loads and stiffness.

This object has been achieved according to the invention by the characteristics outlined below.

Preferred embodiments and other beneficial characteristics of the invention are cited in the subordinate claims.

Based on the prior art, the fluid dynamic bearing system comprises at least one stationary part and one rotating part that form a bearing gap filled with bearing fluid between the opposing bearing surfaces, at least one end of the bearing gap being open and sealed against the environment by a sealing means, pumping grooves being provided on at least one bearing surface to generate hydrodynamic pressure and at least one supply volume connected to the bearing gap being available for the bearing fluid.

According to the invention, the sealing means are formed by pumping grooves that are disposed at the open end of the bearing gap on at least one of the bearing parts and designed in such a way that they generate a pumping action on the bearing fluid directed towards the interior of the bearing and, as a result, create a dynamic seal for the open end of the bearing gap.

As an alternative to a bearing system closed at one end, in a preferred embodiment of the invention the bearing gap has two open ends, both of which are sealed by sealing means. These sealing means can be formed at each open end either by the existing pumping grooves of the bearing system and/or by separate pumping grooves to those of the bearing system which generate an independent pumping action directed towards the inside of the bearing system.

At the same time, the supply volume, preferably in conjunction with the pumping grooves, forms an additional sealing means, wherein, in the case of a bearing gap having two open ends, each of these open ends preferably leads into a supply volume.

In a preferred embodiment of the invention, particularly where a bearing gap has two open ends, the fluid supply is located in two supply volumes separated from each other. Through the opposed pumping action of two sets of fluid dynamic pumping grooves, the bearing fluid is pumped from one supply volume into the other until an equilibrium is reached. The particular form that the supply volume takes is unimportant; what is important is that there is sufficient static tightness to the outside. This arrangement is able to equalize even large changes in pressure and still provide a fluid supply.

The dynamic sealing arrangement according to the invention can be used in all types of hydrodynamic bearing systems, particularly in pure radial bearing arrangements, pure axial bearing arrangements or conical or spherical bearings or a combination of these.

In a preferred embodiment of the invention, the bearing system comprises a first part, consisting of a disk-shaped section and an adjoining cylindrical section affixed concentrically with respect to the rotational axis; a second annular part that is attached to the cylindrical section of the first part, at a spacing to the disk-shaped section, in such a way that an annular space is formed between the two parts and a third annular part, rotatable about the rotational axis with respect to the first and second part, that is accommodated in the annular space.

Bearing fluid is filled into a bearing gap that is formed between the opposing bearing surfaces of the first, second and third part. The pumping grooves used to generate hydrodynamic pressure within the bearing fluid are formed as grooved patterns on selected opposing bearing surfaces of the first, second and third part.

In a preferred embodiment of such a bearing system, there is a first axial bearing that is formed by means of bearing surfaces facing each other of the first and third part, a second axial bearing, formed by means of bearing surfaces facing each other of the second and third part and at least one radial bearing, formed by means of bearing surfaces facing each other of the first and third part.

By integrating the functions of the parts, the bearing presented here consists of only a few parts which can be made using conventional manufacturing methods. Since the required tilt resistance is not achieved by using radial bearings having a large axial spacing but rather by means of axial bearings, the necessary overall height can be kept small. This results in a high level of axial stiffness. The radial stiffness that is still necessary can be achieved by the at least ones relatively "small" radial bearing. This type of construction makes it possible to place the radial bearing in a position that is advantageous for the acting forces.

Another advantage of the invention is the possibility of attaching the bearing at both ends (top and bottom), in other words at the first and second bearing parts. Here, the third part preferably forms the rotating part of the bearing. The possibility of fixing the bearing at both ends is beneficial for applications that have stringent requirements regarding the smooth running of the bearings as, for example, in hard disk drive motors. The basic principle, however, can be equally applied to bearings fixed only at one end.

The bearing gap can be connected together in the regions of the two axial bearings by means of one or more recirculation channels provided in the third part. This aids the circulation of the bearing fluid within the bearing and supports the effectiveness of the dynamic seal due to improved pressure equalization in the bearing.

The bearing system is preferably a component of a spindle motor, as used, for example, in hard disk drives, the third part forming at least a part of the rotor of the spindle motor. For this kind of application, it is advantageous if the bearing system can be attached at both ends, i.e. at the first and/or second part.

It is preferable if the radial bearing has pumping grooves that generate a pumping action directed towards the center of the radial bearing. In comparison, the axial bearings have pumping grooves that generate a pumping action which is mainly directed radially inwards in the direction of the rotational axis. At the same time, the pumping actions of the two axial bearings are directed opposed to each other in the direction of the radial bearing, in other words, towards the interior of the bearing system.

In the arrangement of the supply volumes, it is preferable if a supply volume is arranged at the outside diameter of the disk-shaped section of the first part. The other supply volume, where available, can be arranged accordingly at the outside diameter of the second part. Provision can also be made for a supply volume to be arranged at the first part radially towards the outside in the plane of the first axial bearing. The second supply volume can then be arranged at the second part radially towards the outside in the plane of the second axial bearing.

Each of the supply volumes is preferably formed by means of an annular or conical recess in the relevant bearing part.

BRIEF DESCRIPTION OF THE DRAWINGS

The drawings show.

DESCRIPTION OF THE PREFERRED EMBODIMENTS OF THE INVENTION

Figure 1:
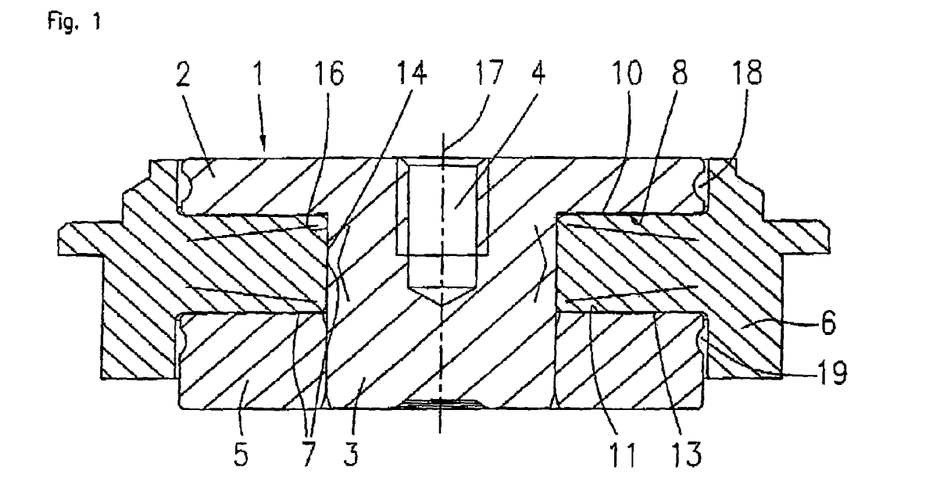
FIG. 1: a section through a bearing system according to the invention having two inwardly operating axial bearings and a symmetric radial bearing.

FIG. 1 shows the basic construction of a bearing according to the invention. The main distinctive feature of the bearing is its simple design and construction. In the version shown in FIG. 1, the bearing consists of only three parts. A first part 1 that has a disk-shaped section 2 and an adjoining cylindrical section 3 affixed concentrically with respect to a rotational axis 17. At least one tapped hole 4 to fasten the part to a housing or suchlike is provided concentric to the rotational axis 17 on part 1. A second annular part 5 is fixed to the cylindrical section 3 of the first part 1 at a spacing to the disk-shaped section 2 in such a way that an annular space between the two parts 1 and 5 is formed. Section 2 of part 1 and bearing part 5 preferably have the same outside diameter. A third, substantially annular, part 6 is partially accommodated in the space and arranged there in such a way that it can rotate about the rotational axis 17 with respect to the first 1 and second part 5.

Parts 1, 5 and 6 are so dimensioned that a bearing gap 7 having a width of some µm is formed between the opposing bearing surfaces of the first, second and third parts. The bearing gap is filled with a bearing fluid such as bearing oil or even air.

The opposing bearing surfaces 8, 10 of the disk-shaped section 2 of the first part 1 and the topside of the third part 6 form a first axial bearing. The opposing bearing surfaces 11, 13 of the second part 5 and of the third part 6 form a second axial bearing. The large diameter, inwards acting (pumping) axial bearings provide high axial stiffness and tilt resistance. Radial loads are taken up by at least one radial bearing formed by the opposing bearing surfaces 14, 16 of the cylindrical section 3 of the first part 1 and of the inside diameter of the third part 6. A plurality of radial bearings located close to one another can also be provided.

Figure 2:
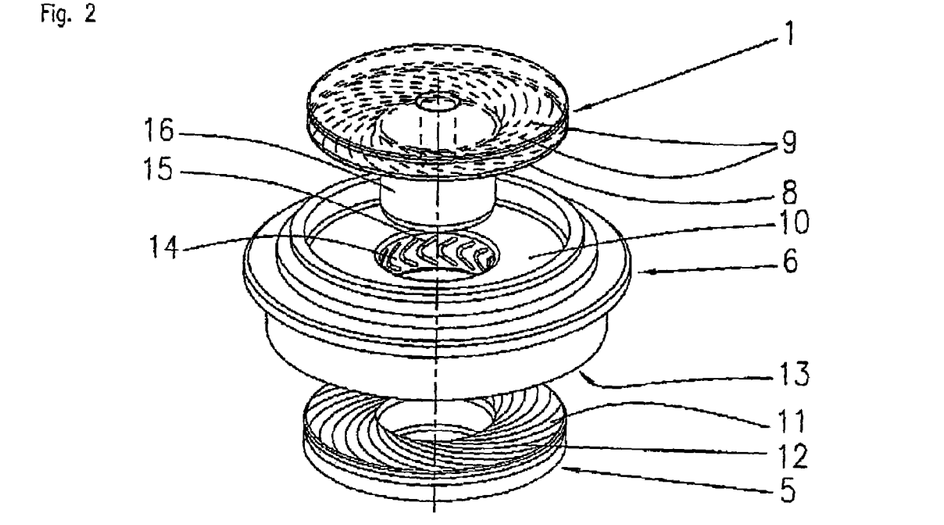
FIG. 2: an exploded view of the bearing outlined in FIG. 1.

FIG. 2 shows an exploded view of the bearing according to FIG. 1. To give the bearing its load-carrying capacity, pumping grooves are provided, using conventional means, on the bearing surfaces of the axial bearing regions and of the radial bearing region. As soon as the bearing surfaces rotate with respect to each other, hydrodynamic pressure is generated within the bearing fluid due to the pumping grooves. These pumping grooves consist of grooved patterns that are disposed on selected, opposing bearing surfaces of the first, second and third parts. The pumping grooves can be provided on either one or on both opposing bearing surfaces as well. It can be seen that the bearing surface 8 of the disk-shaped section 2 of the first part 1 carries a pumping grooving 9 that interacts with the upper bearing surface 10 of the third part 6 and forms the first axial bearing. The upper bearing surface 11 of the second part 5 has a pumping grooving 12 that interacts with the lower bearing surface 13 of the third part 6 and forms the second axial bearing. The radial bearing is formed from pumping grooves 15 that are disposed on the inner bearing surface 14 of the third part 6 which interact with bearing surfaces 16 on the cylindrical section of the first part 1.

Figure 3:
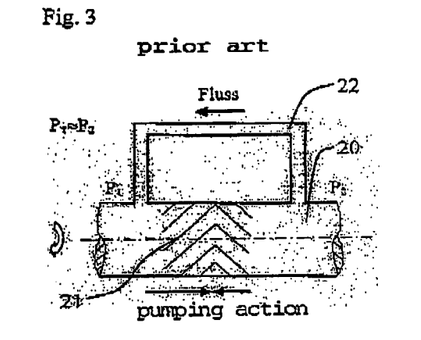
FIG. 3: a schematic example of a single radial bearing with a recirculation channel.
Figure 4:
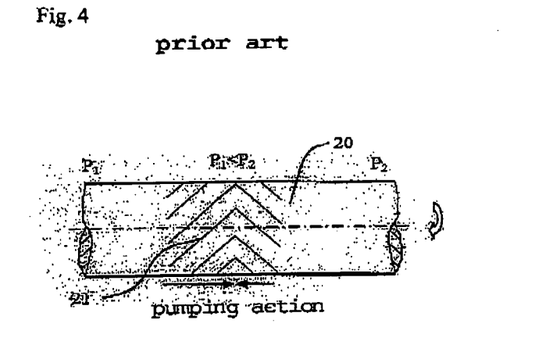
FIG. 4: a schematic example of a single radial bearing without a recirculation channel.
Figure 5:
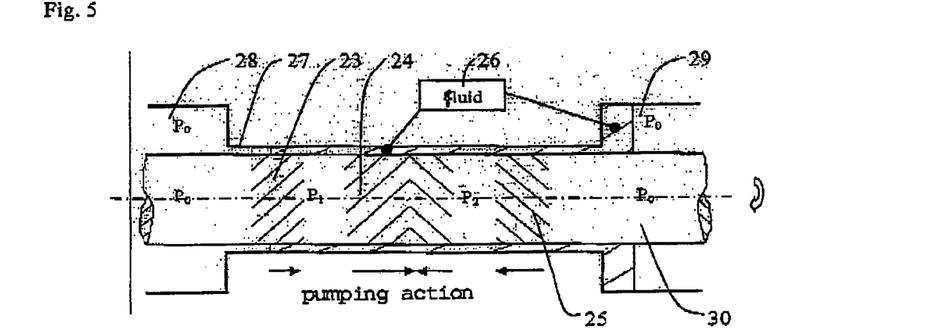
FIG. 5: a schematic example of a single radial bearing with a dynamic seal.

The principle behind the pumping grooves and their function is explained on the basis of FIGS. 3 to 5. FIGS. 3 and 4 show pumping grooves on a single radial bearing. By way of example, FIG. 3 shows a detail of a radial bearing region, on a shaft 20 for instance, having appropriate pumping grooves 21. The direction and intensity of the pumping action on the bearing fluid produced by the pumping grooves is shown by respective arrows. The length of the arrows is proportional to the intensity (pressure) of the pumping action. Manufacturing tolerances and other influences can result in irregular pumping grooves 21 and thus pumping actions of varying intensity. Such asymmetry in the pumping grooves 21 produces different pressures $P_1$, $P_2$ in the bearing. As can be seen in FIG. 3, these pressure differences can be equalized, for example, by using recirculation channels 22, if allowed by the design. Should it not be possible to use recirculation channels, as illustrated in FIG. 4, the pressure differences have to be sealed or equalized in another way.

This is where the invention finds application.

FIG. 5 schematically shows a single radial bearing having pumping grooves 24, on a shaft 30 for example, with a dynamic seal to equalize the pressure differences in the bearing. The bearing here is one that is open at both ends. Ambient pressure $P_0$ is found outside the bearing. Partly asymmetric pumping grooves 23, 24, 25 generate different pressures $P_1$ and $P_2$ in the bearing, the pumping action of the outer pumping grooves 23 and 25 being directed inwards. Pumping grooves 23, 25 prevent bearing fluid 26 from escaping from the bearing gap 27 towards the outside, thus acting as dynamic seals. During operation, an equilibrium is produced in the dynamically sealed fluid bearing such that the pressure differences are equalized. Supply volumes 28, 29 for the bearing fluid are provided at both ends of the bearing gap. The bearing fluid 26 is pumped in the bearing gap 27 in the direction of the strongest resulting pumping action, to the right according to the example illustrated. Here, one supply volume 28 is emptied and the other supply volume 29 is filled with bearing fluid. This process continues until the pumping grooving 23 of the seal is left partially without fluid. The pumping action of this grooving 23 declines commensurate with the filling level of the associated bearing gap section until the pressure differences in the bearing have been equalized. The dynamic seal for fluid bearings thus requires two supply volumes 28, 29 for the fluid supply and two corresponding pumping grooves 23, 25 if the direction of the resulting pumping actions of the individual bearing(s) is unknown.

Figure 6:
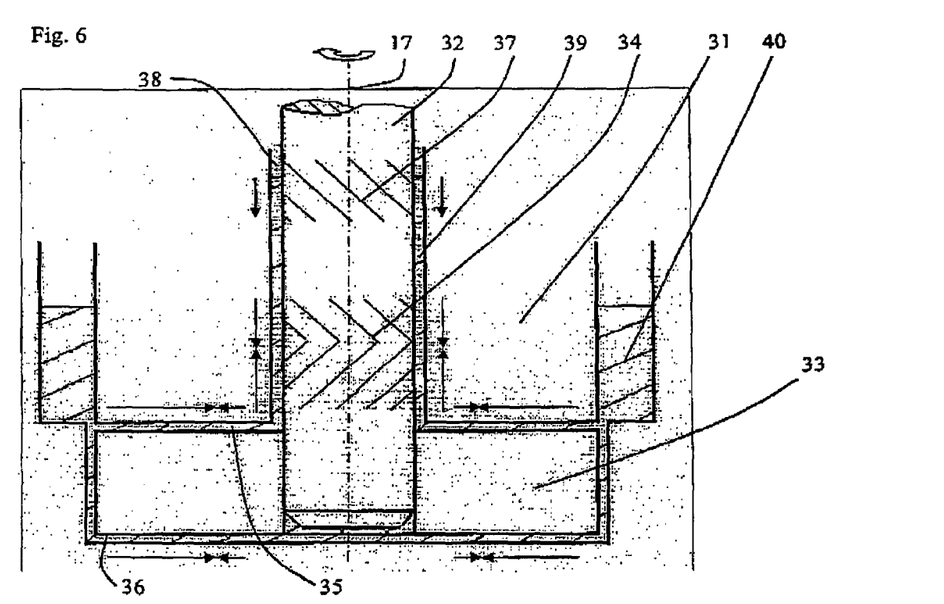
FIG. 6: the principle behind a dynamic seal in a fluid bearing having two axial bearings, a radial bearing and a supply volume for the fluid.

However, if the direction of the resulting pumping actions is defined, as shown in FIG. 6, one supply volume and one pumping grooving suffice for the dynamic seal and to compensate the filling level. The bearing system shown in FIG. 6 comprises a stationary part 31, taking the form, for example, of a bearing bush, and two connected rotating parts 32 and 33, taking the form, for example, of a shaft and a thrust plate. In this example, the bearing system is closed at one end and only open at the top. One radial bearing region 34 and two axial bearing regions 35, 36 arranged below are provided. A pumping grooving 37 at the open end of the bearing gap 38 forms a dynamic seal and ensures that the bearing fluid 39 is pumped towards the bearing interior, in other words in the direction of the closed end of the bearing. A, for example, annular supply volume 40 disposed about the rotational axis 17 ensures that the filling level is compensated in the bearing gap 38. Using a known method, appropriate pumping grooves (not illustrated) are also provided in the axial bearing regions 35, 36. The direction of the pumping action on the bearing fluid produced by the pumping grooves is shown by corresponding arrows. The length of the arrows is proportional to the intensity (pressure) of the pumping action.

The shape and position of the supply volumes shown in the examples in FIGS. 5 and 6 are largely insignificant for the principle of the invention. They need only provide an adequate fluid supply and allow this fluid supply access to the associated pumping grooves. The solution provided can be applied in principle to all types of fluid bearings. This applies, for example, to individual radial or axial bearings, to conical or spherical bearings as well as to combinations of these. Recirculation holes are not absolutely necessary but can go to support to the principle.

Figure 7:
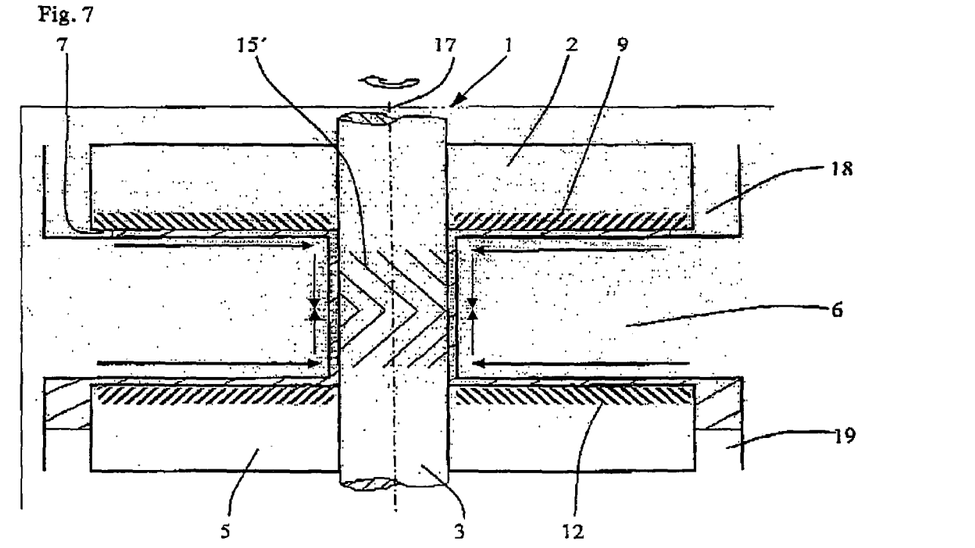
FIG. 7: the principle behind the dynamic seal in a fluid bearing according to FIG. 1 in which the pumping grooving of the seal is simultaneously the bearing grooving.

FIG. 7 shows the principle behind a dynamic seal in a fluid bearing according to FIGS. 1 and 2, having two axial bearings and one radial bearing, in which the pumping grooves of the axial bearing regions simultaneously form the pumping grooves for the dynamic seals. Thus the pumping grooves of the axial bearings together with the two supply volumes form a dynamic sealing system that compensates for manufacturing tolerances. The pumping grooves of the axial bearings can be placed on one or on both the bearing partners. Groove patterns other than the types of pumping grooves shown in FIGS. 1 and 2 are also possible.

The bearing gap 7 between parts 1, 5 and 6 is enlarged in this drawing. It can be seen that the bearing gap 7 is filled with bearing fluid. By means of the pumping grooves 9, 12 of the axial bearing regions, which are found on the underside of part 1 or the topside of part 5, as well as a pumping grooving 15' on the cylindrical section 3 of part 1 (in FIG. 1 the pumping grooving 15 was provided on part 3 as an alternative), the bearing fluid is pumped in the direction of the rotational axis 17. Two supply volumes 18, 19, which can be annular in shape, for example, and arranged at the ends of the bearing gap ensure that the filling level in the bearing gap 7 is compensated. Irregularities in the pumping grooves cause, for example, greater pressure directed towards the inside to be generated by the upper pumping grooving 9 than is generated by the lower pumping grooving 12. The bearing fluid consequently continues to be pumped from the upper supply volume 18 through the bearing gap 7 into the lower supply volume 19 until the upper pumping grooving 9 is left partially without fluid so that an equilibrium with respect to the lower pumping grooving 12 is produced, since the pumping action of this pattern 9 lessens according to the filling level until the asymmetry of the bearings has been compensated. In this example, the pumping grooves 9, 12 of the axial bearings simultaneously act as pumping grooves to dynamically seal the bearing gap 7 in the direction of the supply volumes 18, 19. In FIG. 1, the pressure pattern produced by the pumping grooves is not represented by arrows but rather by respective ramp-shaped markings. The supply volumes are formed as an annular recess on the outside diameter of section 2 of the first part 1 and of the second part 45.

Figure 8:
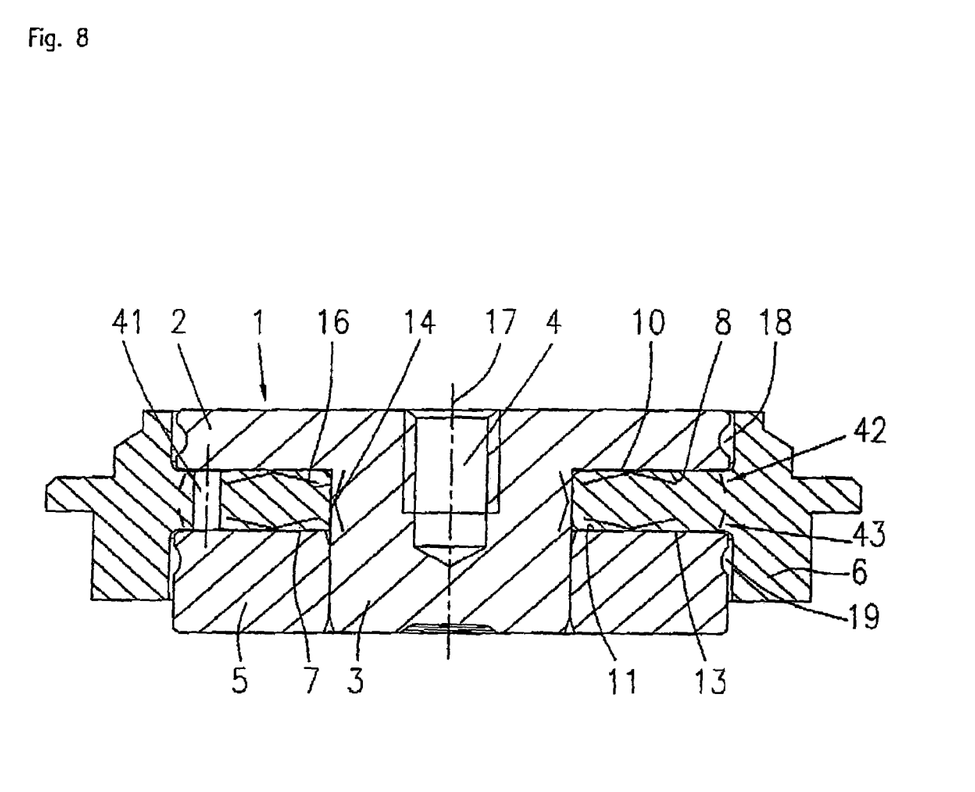
FIG. 8: a section through a bearing system according to the invention similar to FIG. 1, having a recirculation channel and a dynamic seal having two separate sets of pumping grooves.

FIG. 8 shows a bearing system modified vis-à-vis FIG. 1 where identical parts according to FIGS. 1 and 2 are given the same reference numbers. The bearing system comprises a recirculation channel 41 and a dynamic seal having two separate pumping grooves, indicated by the markings 42 and 43. The recirculation channel 41 is formed, for example, as a hole within the third part 6 and supports the action of the dynamic seal and the flow of bearing fluid around and about the bearing grooves in that it connects the outer regions of the bearing gap 7 to one another. The pumping grooves 42 and 43 that form the dynamic seal are formed independently of the pumping grooves of the axial bearing regions and are arranged radially outside the axial bearing regions and the recirculation channels 41.

Figure 9:
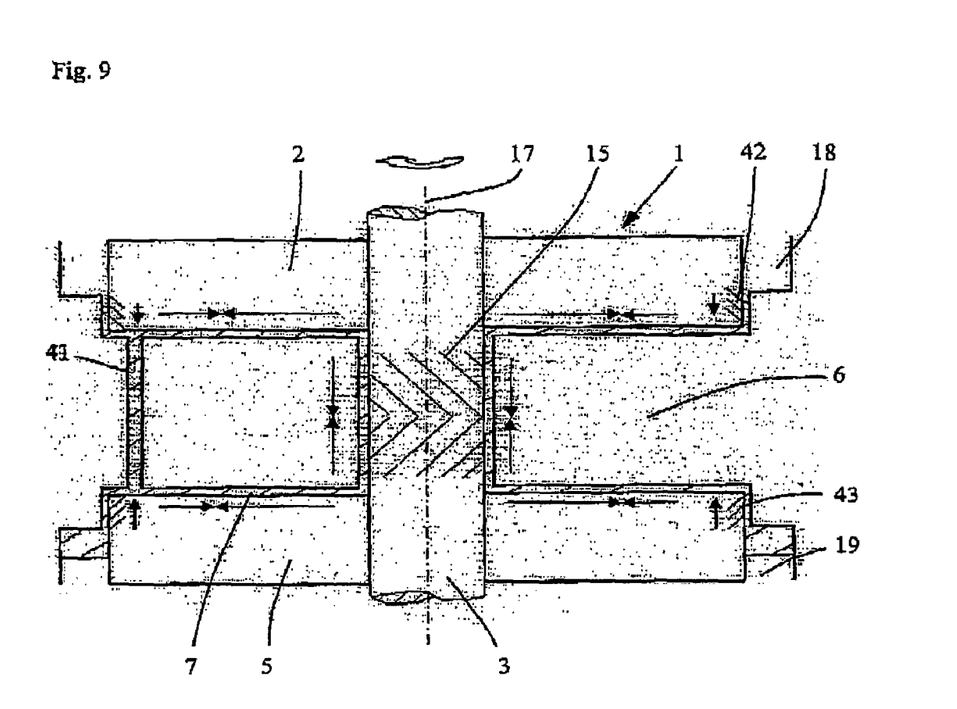
FIG. 9: the principle behind the dynamic seal in a fluid bearing according to FIG. 8.

FIG. 9 makes clear the flow properties and the pressure pattern in the bearing fluid within the bearing system according to FIG. 8. Independent of the pumping action of the axial bearing grooves, the pumping grooves 42 and 43 generate their own pumping action directed to the bearing interior and supported by the amount of bearing fluid held in the supply volumes 18, 19. The recirculation channel 41 ensures rapid pressure equalization between the end regions of the bearing gap.

Figure 10:
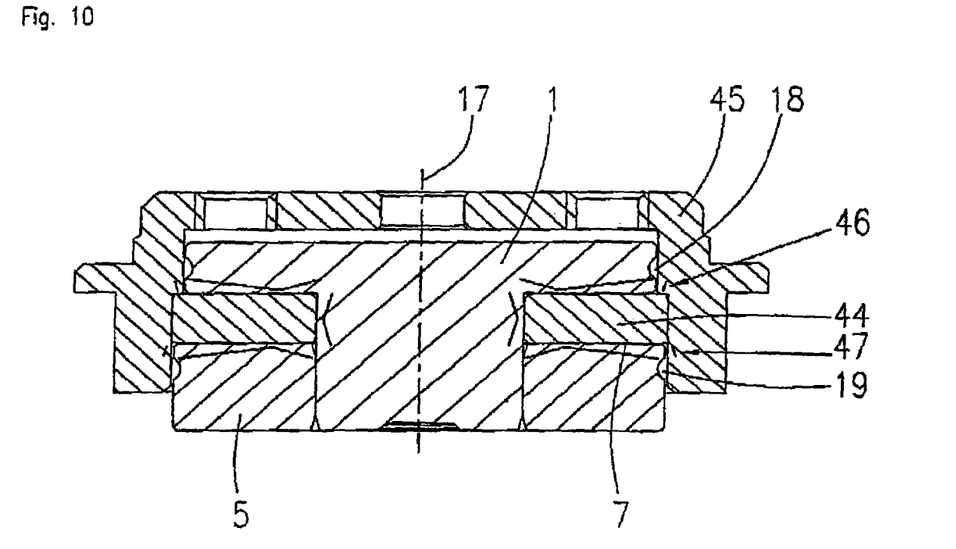
FIG. 10: a section through a further embodiment of a bearing system according to the invention having a separate rotor and a bearing fixed at one end having lateral pumping grooves for the dynamic seal.

FIG. 10 shows a further embodiment of a bearing according to the invention as a bearing that can be attached at one end, having a first part 1 and a second part 5, the third bearing part 44 carrying a further part 45 that acts as a rotor hub. The equalizing volumes 18, 19 are again located at the outside circumference of the first part or of the second part respectively and are connected to the bearing gap 7. Alongside the pumping grooves of the axial bearing regions and of the radial bearing region as described above, separate pumping grooves 46, 47 are again provided to dynamically seal the bearing arrangement. In the illustrated case, however, the pumping grooves are not arranged on the plane of the axial bearing regions, but rather at the inside circumference of the rotor hub 45 and interact with the peripheral surfaces of the first part 1 or of the second part 5 respectively. As an alternative, the pumping grooves for the dynamic seal can also be disposed laterally on the outside circumference of bearing parts 1 and 5.

Figure 11:
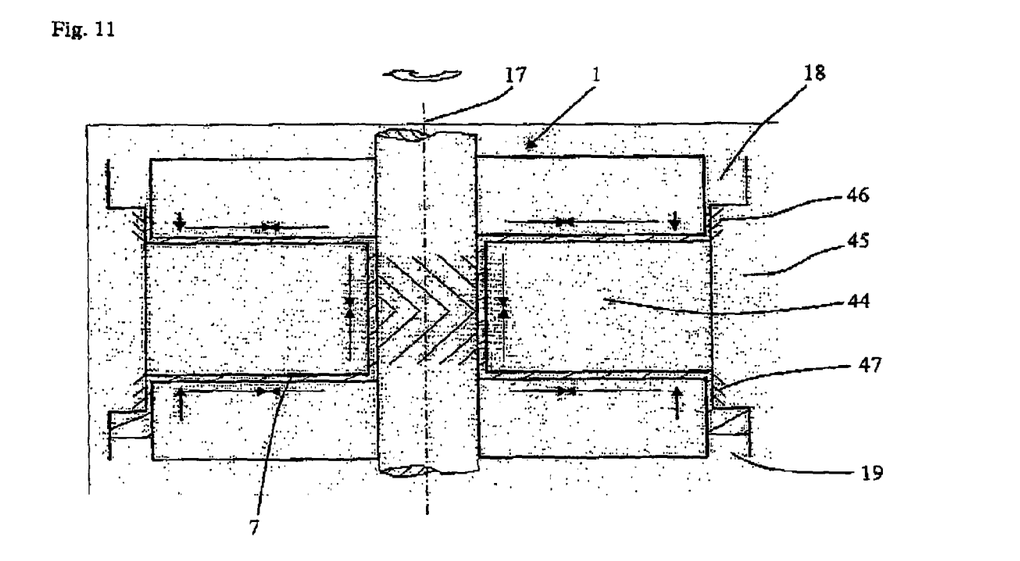
FIG. 11: the principle behind the dynamic seal in a fluid bearing according to FIG. 10, having two axial bearings, a radial bearing and separate pumping grooves.

FIG. 11 shows the pressure pattern within the bearing gap 7 generated by the pumping grooves. The pumping grooves of the radial bearing region are designed so that they generate an opposing pressure build-up directed towards the middle of the bearing gap. The upper and lower axial bearing region also have pumping grooves which generate a pressure pattern directed towards the middle of these pumping grooves, the pressure directed towards the inside of the bearing gap, however, being somewhat higher than the pressure directed outwards. Finally, the pumping grooves 46, 47 of the dynamic seal also generate a pressure pattern directed towards the bearing interior so that the level of bearing fluid between the upper supply volume 18 and the lower supply volume 19 can be compensated.

Figure 12:
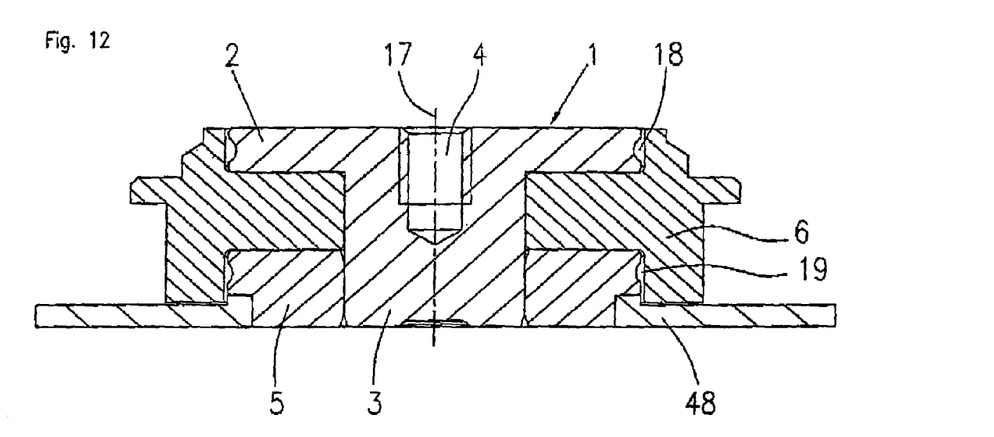
FIG. 12: a section through an embodiment of a bearing system with fixture on a housing flange.
Figure 13:
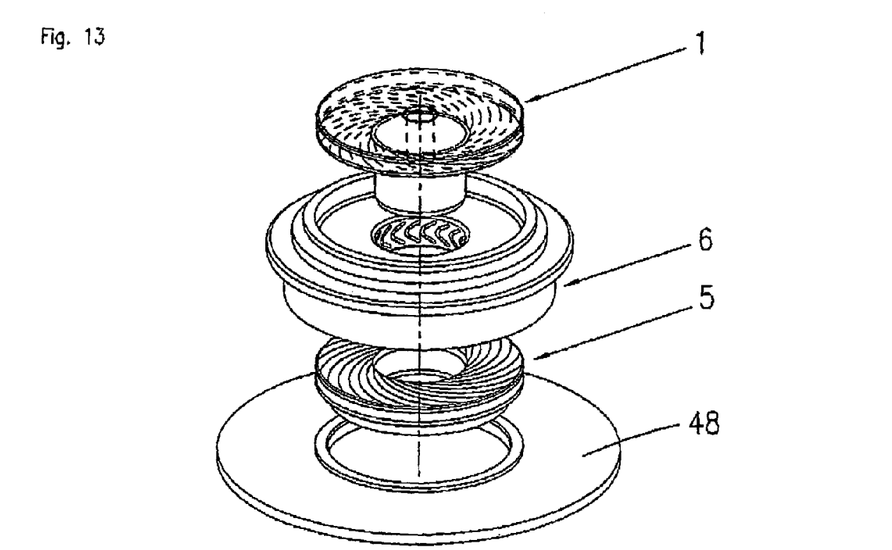
FIG. 13: an exploded view of the bearing outlined in FIG. 12.

FIGS. 12 and 13 show a section and an exploded view respectively of a bearing system, similar to the bearing system of FIGS. 1 and 2. Identical parts are given the same reference numbers. Compared to FIG. 1, the third bearing part 6 is somewhat thicker so that the axial bearing regions have a slightly larger spacing to each other. The second bearing part has an annular recess under the supply volume 19 by means of which it can be inserted into an annular housing flange 48 and fastened there. The design of the pumping grooves on the respective bearing surfaces of parts 1, 5 and 6 correspond to the embodiment according to FIGS. 1 and 2.

Figure 14:
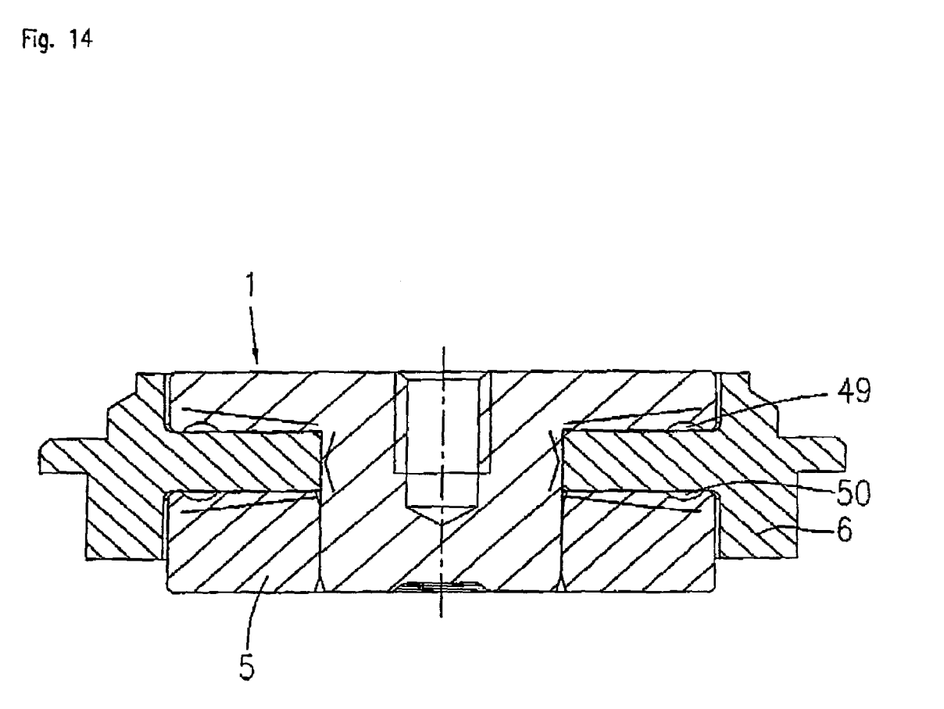
FIG. 14: a section through an embodiment of a bearing system having a horizontal arrangement for the supply volumes.

FIG. 14 shows an embodiment of a bearing system according to the invention that is substantially identical to FIG. 1 in which the supply volumes 49 and 50 are arranged on the same plane as the bearing surfaces of parts 1 and 5 associated with the axial bearing. The dynamic seal is again formed here by making use of the pumping grooves of the axial bearing regions. This means that there are no separate pumping grooves for the seals. Due to the "horizontal" arrangement of the supply volumes, this embodiment of the bearing system has a lower overall height to that of FIG. 1.

Figure 15:
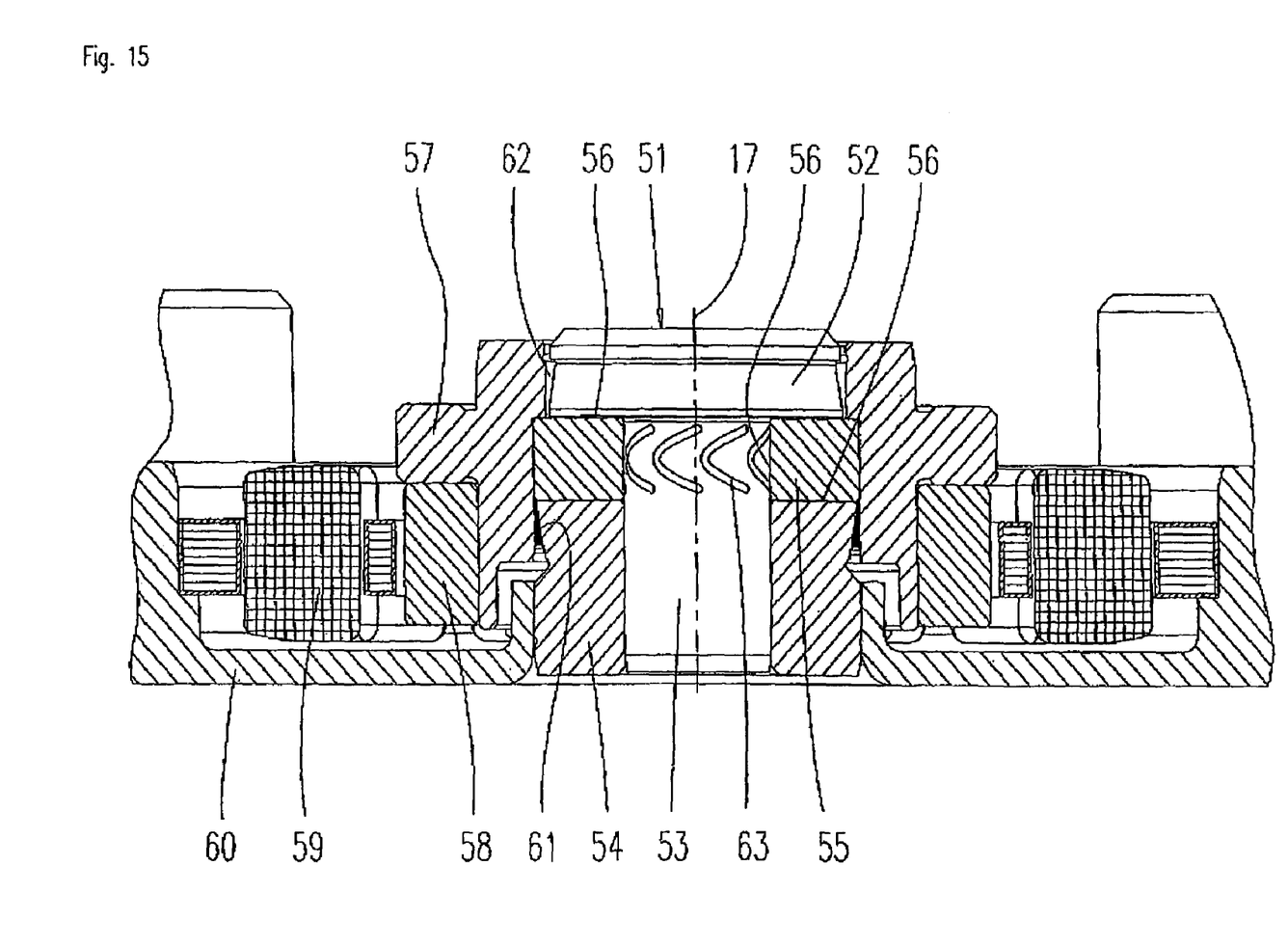
FIG. 15: a section through a spindle motor having a bearing system according to the invention.

FIG. 15 shows a section through a spindle motor that comprises a fluid dynamic bearing system of the construction according to the invention. The design of the bearing system resembles the bearing system illustrated in FIG. 10. This kind of spindle motor can be used, for example, to drive a hard disk drive.

The bearing system comprises a first part taking the form of a stationary shaft 51 that has a disk-shaped section 52 and an adjoining cylindrical section 53 affixed concentrically with respect to a rotational axis 17. A second annular part 54 is fixed to the cylindrical section 53 of the shaft 51 with a spacing to the disk-shaped section 52 in such a way that an annular space between the two parts 51 and 54 is formed. The second part 54 is fixedly accommodated in an opening in the baseplate 60 of the spindle motor. A third, substantially annular part 55 is partially accommodated in the space and arranged and supported there in such a way that it can rotate about the rotational axis 17 with respect to the shaft 51 and the second part 54. Parts 51, 54 and 55 are so dimensioned that a bearing gap 56 having a width of some μm is formed between the opposing bearing surfaces of the first, second and third part. The bearing gap is filled with a bearing fluid such as bearing oil or even air.

The opposing bearing surfaces of the disk-shaped section 52 of the shaft 51 and the end face of the third part 55 form a first axial bearing that is marked, as described, for example, in FIGS. 1 and 2, by appropriate pumping grooves (not illustrated). The opposing bearing surfaces of the second part 54 and of the third part 55 form a second axial bearing having appropriate pumping grooves. The large diameter, inwards acting (pumping) axial bearings provide high axial stiffness and tilt resistance. Radial loads are taken up by at least one radial bearing formed by the opposing bearing surfaces of the cylindrical section 53 of the shaft and of the inside diameter of the third part 55 and appropriate pumping grooves 63. A plurality of radial bearings located close to one another can also be provided in this region of the bearing gap.

The third bearing part 55 carries the hub 57 of the spindle motor which is fixed to the outside diameter of the third part 55, in a pressfit for example, a step at the inside diameter of the hub 57 acting as a stop for the third part 55. At its outside diameter, the hub 57 carries permanent magnets 58 that are a part of the electromagnetic drive system of the spindle motor. A stator arrangement 59 is fixed to the baseplate 60, the stator arrangement being arranged annularly about and at a spacing to the permanent magnets 58 of the hub 57 and forming the other part of the drive system of the spindle motor. The stator arrangement generates an electromagnetic alternating field that acts on the magnets 58 and sets the hub 57 and the rotating part 55 of the bearing connected to the hub 57 in rotation.

Spaces 61 or 62 are provided between the inside diameter of the rotating hub 57 and the outside diameter of the disk-shaped section 52 of the stationary shaft 51 or the outside diameter of the second part 54 respectively. These spaces 61, 62 abut the bearing gap 56 and are connected to it. The spaces 61, 62 are so designed that their cross-sections narrow towards the bearing gap 56 and act as both a capillary seal to seal the bearing gap 56 as well as an equalizing and supply volume for the bearing fluid. Depending on the load on the bearing, one or both spaces 61, 62 are at least partially filled with bearing fluid. The tapered cross-section of the spaces 61, 62 is produced by an appropriate outside geometry of the shaft 51 or of the second part 54 that is inclined with respect to the rotational axis. Of course, this "chamfer" could also be achieved by an according inside geometry of the hub 57.

IDENTIFICATION REFERENCE LIST

1 part (first)
2 Disk-shaped section
3 Cylindrical section
4 Tapped hole
5 Part (second)
6 Part (third)
7 Bearing gap
8 Bearing surface (part 1)

9 Pumping grooving
10 Bearing surface (part 3)
11 Bearing surface (part 2)
12 Pumping grooving
13 Bearing surface (part 3)
14 Bearing surface (part 3)
15 Pumping grooving 15'
16 Bearing surface (part 1)
17 Rotational axis
18 Supply volume
19 Supply volume
20 Shaft
21 Pumping grooving
22 Recirculation channel
23 Pumping grooving
24 Pumping grooving
25 Pumping grooving
26 Bearing fluid
27 Bearing gap
28 Supply volume
29 Supply volume
30 Shaft
31 Part (stationary)
32 Part (rotating)
33 part (rotating)
34 Radial bearing region
35 Axial bearing region
36 Axial bearing region
37 Pumping grooving
38 Bearing gap
39 Bearing fluid
40 Supply volume
41 Recirculation channel
42 Pumping grooving (seal)
43 Pumping grooving (seal)
44 Part (third)
45 Rotor hub
46 Pumping grooving (seal)
47 Pumping grooving (seal)
48 Housing flange
49 Supply volume
50 Supply volume
51 Shaft (first part)
52 Disk-shaped section
53 Cylindrical section
54 Part (second)
55 Part (third)
56 Bearing gap
57 Hub
58 Permanent magnets
59 Stator arrangement
60 Baseplate
61 Space
62 Space
63 Pumping grooves

The invention claimed is:

1. A fluid dynamic bearing system having at least one stationary part (1; 5) and one rotating part (6) that forms a bearing gap (7) filled with bearing fluid between the opposing bearing surfaces, the bearing gap having two open ends sealed against the environment by sealing means, bearing pumping grooves (9; 12) being provided on at least two spatially separated bearing surfaces to generate hydrodynamic pressure and at least one supply volume (18; 19) connected to the bearing gap being available for the bearing fluid, wherein the sealing means are disposed at the open ends of the bearing gap (7) on at least one of the bearing parts (1; 5; 6) and designed to generate a pumping action on the bearing fluid directed towards the interior of the bearing and, as a result, create a dynamic seal for the open ends of the bearing gap, wherein the sealing means are formed by the bearing pumping grooves (9; 12) or sealing pumping grooves (42; 43) separate to the bearing pumping grooves, wherein during the operation of the bearing system one of the sealing pumping grooves or bearing pumping grooves is only partially filled with bearing fluid, and a supply volume is disposed at each open end beyond the sealing pumping grooves or bearing pumping grooves.

2. A fluid dynamic bearing system according to claim 1, characterized in that the entire bearing gap is filled with bearing fluid.

3. A fluid dynamic bearing system according to claim 1, characterized in that the supply volume (18; 19) forms an additional sealing means.

4. A fluid dynamic bearing system that comprises:
a first part (1) consisting of a disk-shaped section (2) and an adjoining cylindrical section (3) affixed concentrically with respect to a rotational axis (17);
a second annular part (5), that is attached to the cylindrical section of the first part, at a spacing to the disk-shaped section (2), forming an annular space between the two parts (1; 5); and
a third annular part (6), rotatable about the rotational axis with respect to the first and second parts and accommodated in the annular space, a bearing fluid that is filled into the bearing gap (7) which is formed between the opposing bearing surfaces (8; 10; 11; 13; 14; 16) of the first, second and third parts (1; 5; 6),
pumping grooves (9; 12; 15) to generate hydrodynamic pressure within the bearing fluid, these grooves being formed on selected opposing bearing surfaces of the first, second and third parts,
wherein the bearing fluid is sealed within the bearing by bearing pumping grooves (9; 12) or sealing pumping grooves (42; 43) separate to the bearing pumping grooves, which are disposed at an open end of the bearing gap (7) wherein during the operation of the bearing system one of the sealing pumping grooves or bearing pumping grooves is only partially filled with bearing fluid, and a supply volume is disposed at an open end beyond one of the sealing pumping grooves or bearing pumping grooves.

5. A fluid dynamic bearing system according to claim 4, characterized in that the fluid dynamic bearing system comprises a first axial bearing that is formed by bearing surfaces (8; 10) facing each other on the first and third part parts (1; 6).

6. A fluid dynamic bearing system according to claim 5, characterized in that the pumping grooves (9; 12) located on the axial bearing generate a pumping action that is mainly directed radially inwards in the direction of the rotational axis.

7. A fluid dynamic bearing system according to claim 5, characterized in that a supply volume (49) is arranged at the first part (1) radially towards the outside in the plane of the first axial bearing.

8. A fluid dynamic bearing system according to claim 5, characterized in that the fluid dynamic bearing system comprises a second axial bearing that is formed by bearing surfaces (11; 13) facing each other on the second and third parts (5; 6).

9. A fluid dynamic bearing system according to claim 8, characterized in that the bearing gap (7) in the region of the two axial bearings is connected together by one or more recirculation channels (41) provided in the third part.

10. A fluid dynamic bearing system according to claim 8, characterized in that a supply volume (50) is arranged at the second part (5) radially towards the outside in the plane of the second axial bearing.

11. A fluid dynamic bearing system according to claim 8, characterized in that the fluid dynamic bearing system has at least one radial bearing that is formed by bearing surfaces (14; 16) facing each other on the first and third parts (1; 6).

12. A fluid dynamic bearing system according to claim 11, characterized in that the pumping grooves located on the radial bearing generate a pumping action directed towards the center of the radial bearing.

13. A fluid dynamic bearing system according to claim 11, characterized in that the pumping action of the two axial bearings is directed opposed to one another in the direction of the radial bearing.

14. A fluid dynamic bearing system according to claim 4, characterized in that the fluid dynamic bearing system is a component of a spindle motor, a third part (44) forming at least a part of a rotor (45) of the spindle motor.

15. A fluid dynamic bearing system according to claim 4, characterized in that the first or second part of the fluid dynamic bearing system is fixed to a carrier.

16. A fluid dynamic bearing system according to claim 4, characterized in that a supply volume (18) is arranged at the outside diameter of the disk-shaped section (2) of the first part (1).

17. A fluid dynamic bearing according to claim 4, characterized in that a supply volume (19) is arranged at the outside diameter of the second part (5).

18. A fluid dynamic bearing system according to claim 4, characterized in that a supply volume is formed by means of an annular or conical recess in the relevant part.

19. A spindle motor having a fluid dynamic bearing system according to claim 4.

20. A hard disk drive having a spindle motor according to claim 19.

* * * * *